United States Patent
Gerlich et al.

(10) Patent No.: US 8,607,825 B2
(45) Date of Patent: Dec. 17, 2013

(54) NON-RETURN VALVE

(75) Inventors: Torsten Gerlich, Bensheim (DE);
Volker Daume, Hirschhorn (DE);
Markus Porsch, Birkenau (DE)

(73) Assignee: Eagle Actuator Components GmbH & Co. KG, Weinheim (DE)

( * ) Notice: Subject to any disclaimer, the term of this patent is extended or adjusted under 35 U.S.C. 154(b) by 362 days.

(21) Appl. No.: 13/011,968

(22) Filed: Jan. 24, 2011

(65) Prior Publication Data

US 2011/0203691 A1    Aug. 25, 2011

(30) Foreign Application Priority Data

Jan. 29, 2010 (DE) .................. 10 2010 006 362

(51) Int. Cl.
*F16K 15/14* (2006.01)

(52) U.S. Cl.
USPC ............. 137/854; 137/493.9; 137/512.15

(58) Field of Classification Search
USPC ............. 137/493.9, 512.15, 512.4, 516.27, 137/516.29, 533.21, 854
See application file for complete search history.

(56) References Cited

U.S. PATENT DOCUMENTS

| | | | | | |
|---|---|---|---|---|---|
| 2,725,075 | A | * | 11/1955 | Irgens | 137/512.1 |
| 3,216,451 | A | * | 11/1965 | Smallpeice | 137/861 |
| 3,592,302 | A | * | 7/1971 | Allinquant | 188/281 |
| 3,633,605 | A | * | 1/1972 | Smith | 137/113 |
| 4,186,768 | A | * | 2/1980 | Kuester | 137/516.25 |
| 4,922,954 | A | * | 5/1990 | Blomquist et al. | 137/493 |
| 5,469,883 | A | * | 11/1995 | Lee | 137/513.3 |
| 5,992,462 | A | * | 11/1999 | Atkinson et al. | 137/854 |
| 7,360,556 | B2 | * | 4/2008 | Mijers | 137/493.9 |
| 7,475,701 | B2 | * | 1/2009 | Trocki et al. | 137/112 |
| 2006/0144453 | A1 | | 7/2006 | Steele | |

FOREIGN PATENT DOCUMENTS

DE    44 39 880 A1    5/1996
EP    1 679 459 A1    7/2006

* cited by examiner

Primary Examiner — John Rivell
Assistant Examiner — R. K. Arundale
(74) Attorney, Agent, or Firm — Leydig, Voit & Mayer, Ltd.

(57) ABSTRACT

A non-return valve includes a valve housing having at least one inlet, at least one outlet, a first valve seat and a second valve seat; and an at least partially flexible sealing member forceable into a sealing engagement with the first valve seat in response to a first differential pressure and forceable into a sealing engagement with the second valve seat in response to a second differential pressure.

20 Claims, 2 Drawing Sheets

NON-RETURN VALVE

CROSS REFERENCE TO PRIOR APPLICATIONS

Priority is claimed to German Application No. DE 10 2010 006 362.2, filed Jan. 29, 2010, the entire disclosure of which is incorporated by reference herein.

FIELD

The present invention relates to a non-return valve, encompassing a valve housing having at least one inlet and at least one outlet, and an at least partially flexible sealing member which is able to be forced into sealing engagement with a valve seat and is actuatable in response to a first differential pressure, as well as to a method for controlling a flow of a medium, including the steps of: moving a flexible sealing member in parallel in a flow direction between two limit stops in response to a minimum differential pressure in a process that is free of prestressing; moving and/or deforming the flexible sealing member to enable it to rest sealingly against a valve seat in response to a first differential pressure.

BACKGROUND INFORMATION

A non-return valve having the features set forth in the definition of the species is known, for example, from the German Patent Application DE 44 39 880 A1.

Non-return valves are generally used for controlling the flow direction of a medium within a line, for example a pipe. The non-return valve automatically blocks the passage of the medium in a first flow direction and opens automatically in a second flow direction (referred to in the following and throughout the Application as the normal flow direction). Thus, if a higher pressure prevails at an inlet of the non-return valve than at an outlet of the non-return valve, the non-return valve is open, and a medium can flow from the inlet to the outlet thereof. If the pressure conditions are reversed, the non-return valve is closed by the higher pressure prevailing at the outlet. A bicycle tire valve or a valve on a motor-vehicle tire are simple examples of non-return valve applications.

To check lines or line systems having a plurality of lines, connections, valves, etc., for leaks, the line system to be tested, together with the valves, etc., is typically subject to the action of a test medium under pressure, and any resultant pressure drop is subsequently measured over a specific time interval. If the pressure drop is below a certain tolerance threshold, the assumption is that no leakage, etc. is present. If this not the case, other parts of the line system, etc., must be individually tested for leakage. If supplementary components, such as non-return valves, for example, are provided in the line system, they may, in some instances, prevent the test medium from being able to act on all parts of the line system, for instance when the test medium is introduced into the line system counter to the normal flow direction. Each of the non-return valves must then be bypassed by what is commonly known as a bypass line.

However, it is complicated, time-consuming and expensive to use these types of bypass lines, first of all, since the bypass line must itself be installed in each case and also activated when the line system is tested. At the same time, connections must also be provided for the bypass line, thereby additionally increasing the space requirements for the line system to be tested, since the placement of a bypass line must be considered when the line system is used.

SUMMARY OF THE INVENTION

An aspect of the present invention provides a simple and cost-effective non-return valve, as well as a method for controlling a flow that will permit a simpler and more cost-effective testing of line systems or the like, in particular of those equipped with non-return valves.

In an embodiment, in response to the presence of the first differential pressure, the non-return valve assumes a first closed position; i.e., the flexible sealing member is pressed onto the first valve seat, sealing the same, when the pressure at the outlet is greater than the pressure at the inlet of the non-return valve. At the same time, however, the application of the first differential pressure does not necessarily cause the flexible sealing member to rest sealingly against the second valve seat as well. Thus, it is still possible for a test medium to pass through the non-return valve counter to its normal flow direction. This eliminates the need for a bypass line for bypassing the non-return valve counter to the normal flow direction. If pressures on the order of the second differential pressure arise during normal operation of the non-return valve, the flexible sealing member is at least pressed onto the second valve seat, sealing the same. If the first and the second valve seat are designed accordingly, for example in that very different diameters are selected for the opening cross sections of the valve seats, it is thereby also achieved that the non-return valve is able to substantially fulfill its usual task, namely to close the line against the normal flow direction when a corresponding second differential pressure prevails at the outlet and inlet of the non-return valve.

Other valve seats may be provided within the scope of the present invention, thereby making it possible to suitably control the passage of a medium counter to the normal flow direction in response to specific differential pressures.

The flexible sealing member is advantageously able to be forced into sealing engagement either with the first valve seat in response to a first differential pressure or with the first and second valve seat in response to the second differential pressure. It is thus achieved that, in response to the first differential pressure, the flexible sealing member is initially pressed sealingly only onto the first valve seat and not onto the second valve seat; it is thus possible for the medium to pass through the non-return valve counter to the normal flow direction. In response to the second differential pressure, the flexible sealing member is then pressed both onto the first, as well as onto the second valve seat and then completely closes the non-return valve. It is no longer possible for the medium to pass through from the outlet to the inlet of the non-return valve.

In order for the flexible sealing member to be sealingly positioned on the first valve seat in response to the first differential pressure and on the first and second valve seat in response to the second differential pressure, it is advantageous for the first differential pressure to be lower than the second differential pressure.

To ensure that the sealing member lifts off from at least one valve seat, respectively does not seal, and that it permits a flow in the flow direction, even at differential pressures of less than a few millibar, it is advantageous for the flexible sealing member to be configured in parallel to the flow direction between limit stops in such a way that it is free of elastic deformations.

It is useful for at least one limit stop to be constituted of at least one, in particular the first valve seat. This reduces to a minimum the number of components required for the non-return valve, thereby saving costs, on the one hand, and minimizing assembly errors during production of the non-return valve, on the other hand.

To further simplify the production of the non-return valve and further reduce assembly errors, it is advantageous for at least one valve seat and/or limit stop to be integrally molded on the valve housing.

The sealing member advantageously cooperates with a device for guiding the flexible sealing member. Thus, the reliability of the non-return valve is enhanced since the flexible sealing member is guided and, therefore, is only able to execute predetermined movements; a slippage of the sealing member, which is tantamount to an at least partial loss of function of the non-return valve, is thereby avoided.

To improve the responsiveness of the non-return valve to pressure variations, it is beneficial for the limit stops to extend in the axial direction of the non-return valve and/or for the flexible sealing member to extend perpendicularly to the axial direction. As used herein, perpendicularly means substantially perpendicularly. Due to the extension of the flexible sealing member perpendicularly to the flow direction, a medium, which passes through the non-return valve, strikes perpendicularly onto a surface of the flexible sealing member. In this manner, a flow pressure of the medium is transmitted directly and immediately to the flexible sealing member.

The method for controlling a flow including the steps of: moving a flexible sealing member in parallel in a flow direction between two limit stops in response to a minimum differential pressure in a process that is free of prestressing; moving and/or deforming the flexible sealing member to enable it to rest sealingly against a valve seat in response to a first differential pressure. Thus, in response to a second differential pressure, the flexible sealing member is moved and/or deformed in such a way that it rests sealingly against at least one second valve seat. Here, in response to the presence of a first differential pressure, the non-return valve rests sealingly against the first valve seat. Thus, when the valves seats are configured for this purpose, a passage of flow counter to the flow direction is also made possible for a test medium. In response to the presence of the second differential pressure, the flexible sealing member is moved and/or deformed, so that it rests sealingly at least against the second valve seat. As a result, the flexible sealing member then essentially closes the non-return valve counter to the normal flow direction. This makes it possible, on the one hand, to test the non-return valve using a test medium under pressure counter to the normal flow direction. On the other hand, this also permits the normal function of a non-return valve, namely of essentially preventing a medium from passing through counter to the normal flow direction.

Other advantages and features of the present invention are derived from the following description of an exemplary embodiment which makes reference to the drawing.

DETAILED DESCRIPTION

Figure 1:
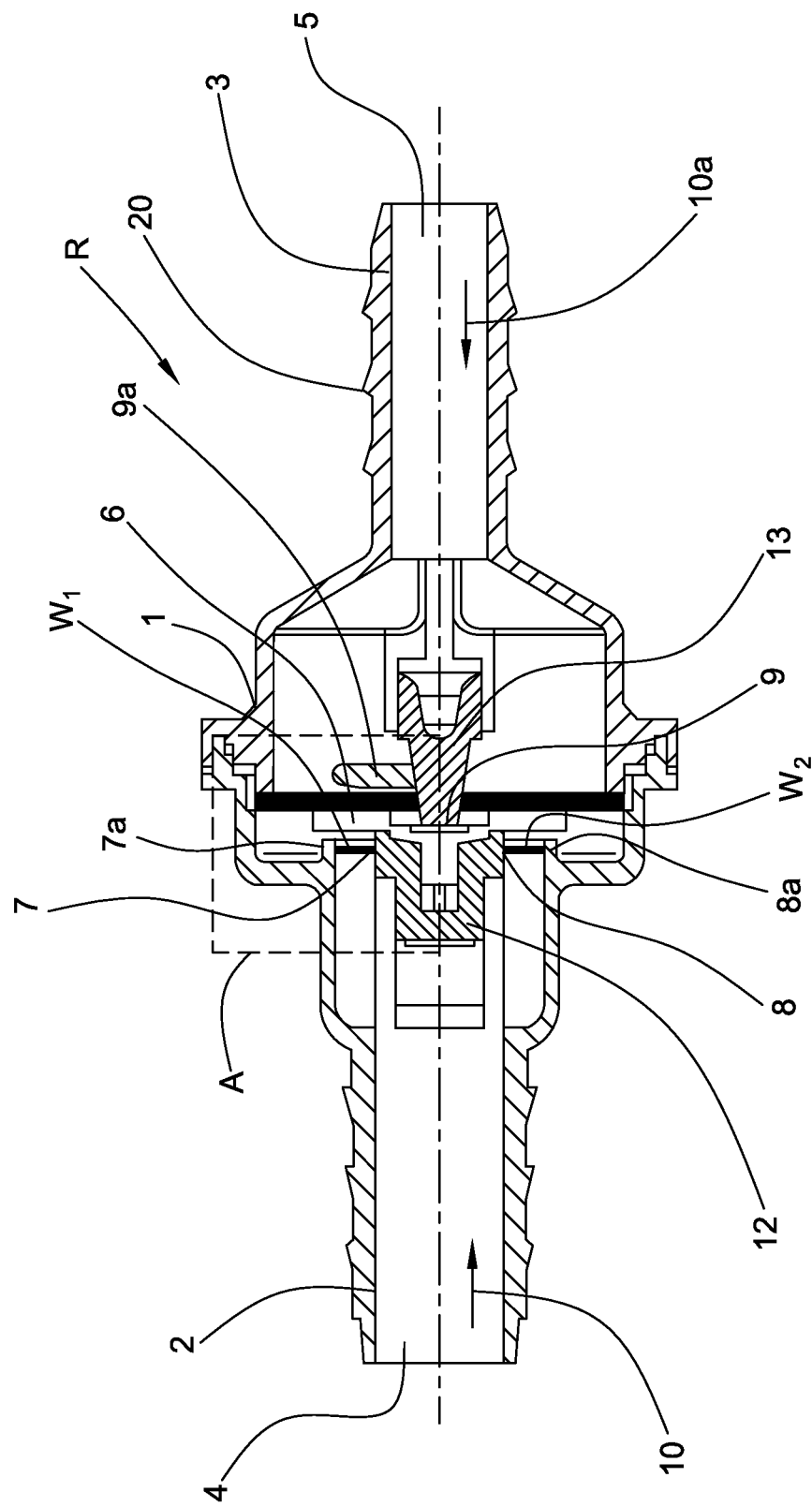
FIG. 1 shows a non-return valve according to the present invention in a first exemplary embodiment, in cross section, the flexible sealing member resting against the first valve seat.

An exemplary embodiment of a non-return valve R is shown in FIG. 1, non-return valve R forming part of a line (not shown) that is acted upon by a medium. In this context, non-return valve R includes two housing parts 2, 3, which, following assembly of flexible sealing member 6, are welded together and, on the whole, thereby form a valve housing 1. Valve housing 1 has an inlet 4 and an outlet 5, inlet 4 having both a larger inner diameter, as well as a larger outer diameter than outlet 5. This virtually rules out any chance of the inlet and outlet being mixed up when non-return valve R is installed in a line. Radially projecting protuberances 20 are configured in a sawtooth form on housing part 2, 3 in the area of inlet 4 and outlet 5. These make it possible to reliably attach hoses and the like to non-return valve R.

Flexible sealing member 6 is made of an elastomer material and is essentially able to be circumflowed by medium. Non-return valve R encompasses first valve seats 7, 8 and second valve seats 7a, 8a, which are each integrally formed in one piece with first housing part 2. Valve seats 7, 7a, 8, 8a are formed by a projection 7, 7a, 8, 8a configured in flow direction 10. In a completely closed position (see FIG. 2, position $P_2$) of non-return valve R, flexible sealing member 6 engages sealingly both on first valve seat 7, 8, as well as on second valve seat 7a, 8a.

In addition, flexible sealing member 6 is movably configured in the axial direction between limit stops 8, 9, limit stop 8 of first housing part 2 being formed by valve seat 7. Second limit stop 9 is formed by a frustoconical projection 9 of second housing part 3 in counterflow direction 10a.

Flexible sealing member 6 is able to move between limit stops 8, 9 in parallel to flow direction 10 in a state that is free of elastic deformation. In addition, flexible sealing member 6 has a plug 13 which is configured in a guide 12 that is likewise integrally molded in one piece on housing part 2. It is thereby achieved that flexible sealing member 6 is movably configured only in parallel to flow direction 10. Flexible sealing member 6, as well as guide 12 are designed to permit flexible sealing member 6 to move freely between limit stops 8, 9, even in response to low differential pressures between inlet 4 and outlet 5.

The function of non-return valve R in an operating state is described in the following with reference to FIGS. 1 and 2.

First a state of rest is described; i.e., a pressure $p_E$ of a medium on the side of inlet 4 is equal to pressure $p_A$ of the medium on the side of outlet 5 of non-return valve R. Flexible sealing member 6 essentially does not move in the process. If, at this point, pressure $p_E$ is increased, i.e., $p_E$ is greater than $p_A$, then flexible sealing member 6 moves axially out of a rest position in accordance with FIG. 2 in parallel to flow direction 10 to the right, into a position $P_3$, so that flexible sealing member 6 then rests without deformation against limit stop 9. If, at this point, pressure $p_E$ is increased further, then flexible sealing member 6 is no longer able to be axially displaced in parallel to the flow direction; i.e., flexible sealing member 6 deforms due to the increasing pressure in the direction of the lower pressure and then reaches a position $P_4$.

Figure 2:
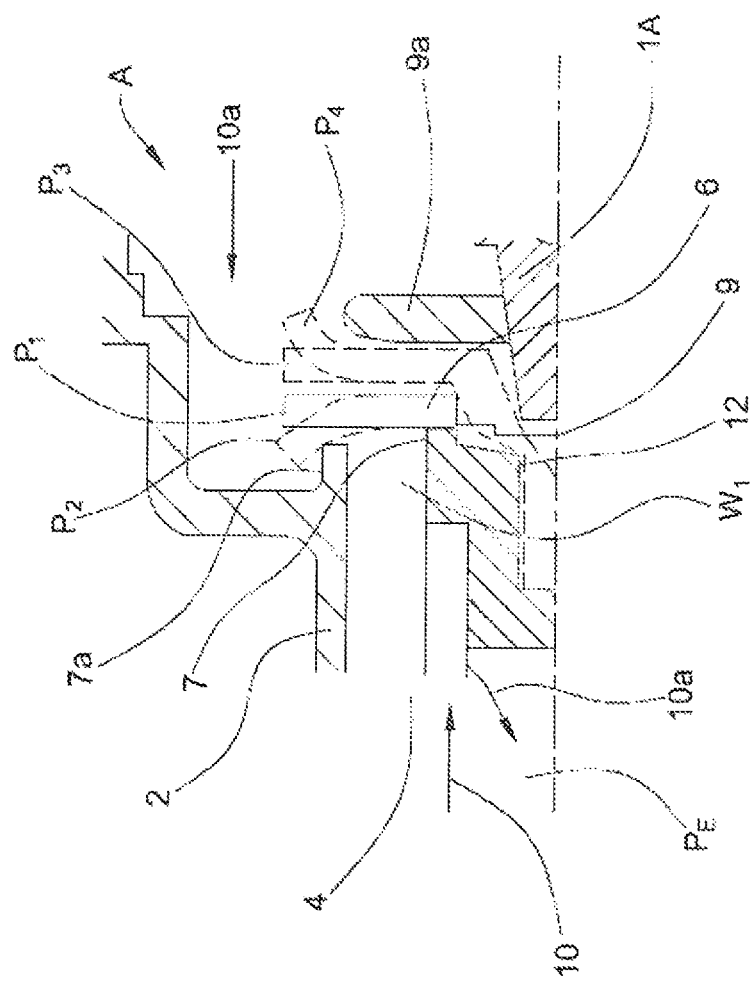
FIG. 2 shows a detail A of FIG. 1 in detail.

If, at this point, pressure $p_E$ drops again at inlet 4, flexible sealing member 6 is no longer deformed, respectively the deformation recedes to the initial value; i.e., flexible sealing member 6 is located, in turn, in position $P_3$ in accordance with FIG. 2. If pressure $p_E$ at inlet 4 continues to fall, for example, until pressure $p_A$ at outlet 5 is greater than pressure $p_E$ at inlet 4, then flexible sealing member 6 moves in parallel and counter to flow direction 10 until it rests against limit stop 8 in the form of valve seat 7 in accordance with position $P_1$. If a first opening $W_1$ is configured, which is able to be sealingly closed via first valve seat 7, 8, then flexible sealing member 6 may seal first opening $W_1$, preventing any more medium from being able to flow through first opening $W_1$. At the same time, however, it is still possible for the medium to pass in counterflow direction 10a through a second opening $W_2$ between inlet 4 and outlet 5 into inlet 4. This is the desired state during a test of a line system having non-return valves, in that, in response to the application of a specific differential pressure, pressure $p_A$ being greater than pressure $P_E$, a test medium is still able to flow through from outlet 5 to inlet 4.

If pressure $p_A$ at outlet 5 continues to increase relative to pressure $p_E$, then flexible sealing member 6 deforms counter to flow direction 10 to the point where it also rests sealingly against second valve seat 7a, 8a. This corresponds in FIG. 2 to position $P_2$ of flexible sealing member 6. Thus, flexible sealing member 6 closes both first opening $W_1$, as well as second opening $W_2$ configured between the two valve seats 7, 7a. This prevents a medium from being able to pass over from outlet 5 to inlet 4. This corresponds to the normal function of a non-return valve.

To limit the flow rate in flow direction 10, radially protruding limit stops 9a may be additionally configured on housing part 3, so that a deformation of flexible sealing member 6 in position $P_4$, i.e., in response to an input-side pressure $p_E$, is greater than output-side pressure $p_A$. Thus, a maximum cross section for the flow of a medium from inlet 4 to outlet 5 is defined by non-return valve R; a possible flow of a medium through the non-return valve in the flow direction is thereby limited.

The following describes the operating principle applied during a test of lines having non-return valves R in accordance with the present invention. To this end, a test medium is introduced to a line system made up of lines and non-return valves. The test medium itself has a test pressure $p_A$ applied thereto. The test medium is supplied at outlet 5 of non-return valve R; in this context, pressure $p_E$ at inlet 4 is lower than pressure $p_A$. Due to the pressure differential, flexible sealing member 6 moves from its rest position, for example from position $P_3$ into position $P_1$, and thereby seals first opening $W_1$. The test medium used to test the imperviousness of the line system may, however, continue to pass over via second opening $W_2$ to inlet 4, making it possible for the test medium to be introduced to the entire line system. Except for one supply line used for supplying the test medium that has a test pressure applied thereto, the line system may subsequently be sealed pressure-tight. If, at this point, the pressure in the line system drops within a time interval, and/or if it is necessary to introduce more test medium into the line system in order to maintain the test pressure, then this is indicative of leakage in the line system.

The possible maximum test pressure for the test medium is dependent, first of all, on the design of second valve seat 7a, 8a. For example, if in accordance with FIG. 2, second valve seat 7a, 8a projects further in the flow direction in parallel thereto, then flexible sealing member 6 rests sealingly against second valve seat 7a, even given a slight deformation. Already at a lower pressure $p_A$, the test medium is no longer able to flow from outlet 5 into inlet 4 via second opening $W_2$.

On the other hand, the possible maximum test pressure is also dependent on the material, respectively the design of flexible sealing member 6 itself. If its material has a greater hardness, then flexible sealing member 6 deforms only in response to correspondingly higher test pressures and consequently rests sealingly against second valve seat 7a, also only in response to the corresponding higher test pressures. It must be considered in this context that the result of a possible higher test pressure is that non-return valve R is also able to execute its normal function, namely of preventing a backflow of a medium from outlet 5 to inlet 4, only at corresponding pressures above the test pressure, i.e., when flexible sealing member 6 rests sealingly on valve seats 7, 8, 7a, 8a.

The invention claimed is:

1. A non-return valve comprising:
   a valve housing having at least one inlet, at least one outlet, a first valve seat and a second valve seat; and
   an at least partially flexible sealing member forceable into a sealing engagement with the first valve seat in response to a first differential pressure and forceable into a sealing engagement with the second valve seat in response to a second differential pressure,
   wherein the first valve seat includes a first limit stop,
   wherein the housing includes a second limit stop, and
   wherein the flexible sealing member is movably mounted in parallel to a flow direction between the first and the second limit stop in such a way that the flexible sealing member is free of elastic deformations.

2. The non-return valve as recited in claim 1, wherein the flexible sealing member is forceable into a sealing engagement with both the first valve seat and the second valve seat in response to the second differential pressure.

3. The non-return valve as recited in claim 1, wherein the first differential pressure is lower than the second differential pressure.

4. The non-return valve as recited in claim 1, wherein the first valve seat includes at least two limit stops.

5. The non-return valve as recited in claim 1, wherein at least one of the first valve seat, the second valve seat, the first limit stop and the second limit stop is integrally molded on the valve housing.

6. The non-return valve as recited in claim 1, further comprising a guiding device configured to guide the flexible sealing member.

7. The non-return valve as recited in claim 1, wherein the first and second limit stops extend in an axial direction of the non-return valve.

8. The non-return valve as recited in claim 1, wherein the flexible sealing member extends perpendicularly to an axial direction of the non-return valve.

9. The non-return valve as recited in claim 1, wherein a limit stop is disposed in an area of the outlet and configured to limit the deformation of the flexible sealing member.

10. The non-return valve as recited in claim 1, wherein the first valve seat is integrally molded on the valve housing.

11. The non-return valve as recited in claim 1, wherein the second valve seat is integrally molded on the valve housing.

12. The non-return valve as recited in claim 1, wherein the first limit stop is integrally molded on the valve housing.

13. The non-return valve as recited in claim 1, wherein the second limit stop is integrally molded on the valve housing.

14. The non-return valve as recited in claim 1, wherein the first valve seat and the second valve seat are integrally molded on the valve housing.

15. A non-return valve comprising:
   a valve housing having at least one inlet, at least one outlet, a first valve seat and a second valve seat; and
   an at least partially flexible sealing member forceable into a sealing engagement with the first valve seat in response to a first differential pressure and forceable into a sealing engagement with the second valve seat in response to a second differential pressure,
   wherein the first valve seat includes a first limit stop,
   wherein the housing includes a second limit stop,
   wherein the flexible sealing member is movably mounted in parallel to a flow direction between the first and the second limit stop in such a way that the flexible sealing member is free of elastic deformations, and
   wherein at least one of the first valve seat, the second valve seat, the first limit stop and the second limit stop is integrally molded on the valve housing.

16. The non-return valve as recited in claim 15, wherein the flexible sealing member is forceable into a sealing engagement with both the first valve seat and the second valve seat in response to the second differential pressure.

17. The non-return valve as recited in claim 15, wherein the first differential pressure is lower than the second differential pressure.

18. The non-return valve as recited in claim 15, wherein the first valve seat includes at least two limit stops.

19. The non-return valve as recited in claim 15, further comprising a guiding device configured to guide the flexible sealing member.

20. The non-return valve as recited in claim 15, wherein the first and second limit stops extend in an axial direction of the non-return valve.

* * * * *